US011003762B2

(12) United States Patent
McIntosh

(10) Patent No.: US 11,003,762 B2
(45) Date of Patent: May 11, 2021

(54) PASSWORD HIDDEN CHARACTERS

(71) Applicant: William John McIntosh, Hampton (CA)

(72) Inventor: William John McIntosh, Hampton (CA)

( * ) Notice: Subject to any disclaimer, the term of this patent is extended or adjusted under 35 U.S.C. 154(b) by 84 days.

(21) Appl. No.: 16/602,533

(22) Filed: Oct. 25, 2019

(65) Prior Publication Data

US 2020/0125719 A1    Apr. 23, 2020

Related U.S. Application Data

(63) Continuation-in-part of application No. 15/330,394, filed on Sep. 15, 2016, now abandoned.

(51) Int. Cl.
*G06F 21/46*    (2013.01)
*H04L 9/32*    (2006.01)

(52) U.S. Cl.
CPC ............ *G06F 21/46* (2013.01); *H04L 9/3228* (2013.01)

(58) Field of Classification Search
None
See application file for complete search history.

(56) References Cited

U.S. PATENT DOCUMENTS

| | | | | |
|---|---|---|---|---|
| 8,271,974 B2* | 9/2012 | Mazhar | ................... | H04L 43/10 717/177 |
| 9,288,148 B1* | 3/2016 | Krishnaswamy | ... | H04L 41/0893 |
| 9,648,107 B1* | 5/2017 | Penilla | ................... | G06F 3/0482 |
| 9,866,551 B2* | 1/2018 | Hwang | ................... | G06F 21/31 |
| 2005/0149762 A1* | 7/2005 | Smith | ................. | H04L 63/0846 726/19 |
| 2012/0235912 A1* | 9/2012 | Laubach | ............... | G06F 3/0213 345/163 |
| 2012/0254622 A1* | 10/2012 | Kanungo | ................ | G06F 21/34 713/183 |
| 2012/0322391 A1* | 12/2012 | Suzuki | .................. | H04W 76/10 455/68 |
| 2013/0158880 A1* | 6/2013 | Mande | ................... | G16B 45/00 702/19 |
| 2013/0231947 A1* | 9/2013 | Shusterman | ....... | A61B 5/02055 705/2 |
| 2014/0173286 A1* | 6/2014 | Novak | .................. | G06F 21/316 713/176 |
| 2014/0317744 A1* | 10/2014 | Turgeman | ............. | H04W 12/06 726/23 |
| 2015/0082408 A1* | 3/2015 | Yeh | ....................... | H04B 5/0025 726/9 |
| 2015/0161362 A1* | 6/2015 | Clift | ........................ | G06F 21/10 713/171 |
| 2016/0180019 A1* | 6/2016 | Van Rooyen | .......... | G16B 40/00 702/19 |
| 2016/0342747 A1* | 11/2016 | Sale | ........................ | G16H 20/10 |
| 2017/0163625 A1* | 6/2017 | Brown | .................. | H04L 63/083 |
| 2018/0218142 A1* | 8/2018 | Wang | .................... | G06F 3/0233 |

\* cited by examiner

*Primary Examiner* — Kaveh Abrishamkar

(57) ABSTRACT

Password Hidden Characters is a security method which creates characters which are invisible. It is a method comprising steps used to insert time intervals between specific password characters, or to replace characters which have been withdrawn from the password or message, with the objective being to disguise a true password or message meant to be secret, and by so doing to create an invisible code. The invisible code allows messages which are supposed to be secret to remain that way. This protection evolves from the withdrawal of any six characters out of a total of 26 available, and the number of permutations created when this is done.

5 Claims, No Drawings

PASSWORD HIDDEN CHARACTERS

BACKGROUND OF THE INVENTION

Because of the ever increasing importance of security, the ability of hackers to get access to a password could have devastating results. Some hackers have set up covert video recording devices to observe credit card usage at receptacles, to obtain the passwords.

To combat identity theft, it is necessary to have more than conventional passwords, pin numbers or fingerprints. You need a covert procedure which hackers cannot pick up even from a hidden video. You also need a method to send messages that cannot be intercepted and hacked.

Even fingerprints can be obtained over a period of time by skilled sleuths.

Facilities access depends on a card being presented, and the most advanced passwords incorporate fingerprints, numbers of prints, and combinations. If skilled sleuths have the fingerprints, and a covert video shows prints used and in what combination, then access can be compromised. A method has to be developed that accomplishes three things:
1. It will not be detected as in use from even a covert video of a user at a receptacle.
2. It must prevent access even if password, prints, pin numbers and combinations of prints have been compromised.
3. It must make it possible to disguise secret messages with five barriers to hacker entry. The barriers are: invisibility, the time unit used to differentiate pauses, time units per character, ability to change the code, and ability to change the time unit.

Brief Summary of the Invention

I propose a pause program, inserting pause times between certain characters.

The time pause program is particularly useful for providing additional security to passwords. It is invisible and known only by the user. The following presentation will consider the time pause as a character, as a simple approach for improving passwords significantly.

Messages which must be absolutely secret can be disguised with the invisible code described herein.

Users can lose an access card, have their conventional password compromised, or have it stolen or hacked. This problem is unlikely to occur with the pause character method because it is well hidden, not observable even when used, and known only by the authorized user.

In order for hackers to breach Password Hidden Characters, they must know four things:
1. They must be aware of the use of time pauses as character inputs.
2. They must know the time units between inputs.
3. They must know the time unit used to measure time units per pause. You can vary the time unit.
4. They must know the code which tells time units per invisible character.

Two patents exist using time delays in passwords or messages.

Smith patent 2005/0149762 discloses association of a time delay between each character of a password. This would make sending messages extremely difficult and time consuming, not to mention the time component required to decode a message using his approach. His claims end with the phrase "of the password", and were not designed to disguise the content of a message. Smith has a time delay between each character in a password, whereas Password Hidden Characters only has chosen time intervals to replace the few characters that have been chosen to be withdrawn from the message, and none between characters. Password Hidden Characters does not have time intervals put between each character of a password, only a plurality.

Brown patent 2017/0163625 records the exact times when all password characters are entered, and uses relative times for creating a multi-dimensional password. He measures existent times from a user, and does not insert variable time intervals. Relative time analysis is excellent for differentiating password entry patterns, but is not useful with regard to disguising the content of a message. Relative times are significantly different from time intervals placed to replace withdrawn characters, because one approach measures existent variables that are between all characters, and Password Hidden Characters places chosen time intervals in only a few message locations, only to replace withdrawn characters, and none between characters. Brown is concerned with the relative times between all characters in a password, but Password Hidden Characters only puts time intervals between a plurality of password characters, not all of them.

DETAILED DESCRIPTION OF THE INVENTION

There has been a failure in the access password system for security against unauthorized users. Many facilities are presently at risk, because of password design failures.

It is the object of the Password Hidden Characters system, called PHC for brevity, to provide an invisible security barrier, using no additional numbers, letters, symbols, or fingerprints. The PHC cannot be observed by a hidden video, and cannot be deciphered by hackers.

If you want to have a secret password, you can use pauses between password characters to disguise several characters. For example, to hide the letter "a" you could have a three second pause, and to hide the letter "y", a six second pause. With several hidden characters in your password, your security is greatly enhanced.

Now let us cover the sending of secret messages, using the same general approach just shown. For example, to hide the meaning of a very confidential message, one could choose to remove certain letters, like: a, e, i, o, u, and y. When the letters are removed from the message, they are replaced by measured and specific pauses. With letter removal, the meaning of the important message becomes unintelligible.

The code works by inserting measured pauses between certain letters, determining how many time units are to be in each pause, and letting each letter to be removed be represented by a specific range of time units. Time units could be seconds, shorter time units of seconds, or longer units of time then seconds. An assignment of time units could look like this:

| Character removed | A | E | I | O | U | Y |
|---|---|---|---|---|---|---|
| Time units assigned | 1-2 | 2-4 | 4-6 | 6-8 | 8-10 | 10+ |

When composing a coded message, occasionally adjacent hidden characters will occur. For clarity, one could place a comma or slash to indicate each adjacent character. Here is a sample message to be disguised, and reduced to gibberish:

"Looking at a sequenced bay flank attack."

The sender prepares this message for transmission by setting it up as follows:

L*,*K*NG/*T/*/S*Q*,*N C*D/B*,*/FL*NK/*TT*CK. 82 (* represent pauses)

When the sender has removed certain characters, he sends the message using the pauses as described above. (sender does not send asterisks) The recipient should be covertly provided with the assignment of time units/character, or perhaps provided with a secret calendar schedule of planned codes. The number 82 could be the secret frequency used to send a deciphering table.

It follows that, for an unauthorized person to break the code, they must have, or be aware of:

1. An ability to measure the time between characters.
2. The list of letters that have been chosen to disappear. (Can be changed each transmission)
3. The time units assigned/character. (Can be changed with each transmission)
4. The length of the chosen time unit. (Can be changed with each transmission)
5. The fact that some items are invisible.

Advantages of the Invention

1. The various types of pauses eliminate any possibility of covert observers being able to discern the password.
2. Hackers who have been successful in obtaining symbols, letters, numbers or fingerprints will have to break into the operating system to pick up the times between character inputs, and this is an additional formidable task.
3. Secret message senders can change which letters are invisible, and also vary the time unit used.
4. Hackers have been in the business of obtaining data files to steal passwords, but now they will have to somehow obtain both the interval times, and the Time unit/character.
5. Every organization or department can choose a different Time unit and coding table.
6. The method is simple to use, and needs no encryption.
7. Some unauthorized users that intercept a message will assume that what they have is, in itself, a code. But it is simply a message with parts of it missing.

I claim:

1. A method for creating a password or message with hidden characters comprising:

determining a plurality of characters to be removed from a password or message;

assigning a different range of time intervals to each of the characters to be removed;

removing the plurality of characters from the message or the password;

replacing each removed character with the associated time interval, wherein each associated time interval is inserted as a character input in place of the associated removed character; and creating the password or the message by inserting the associated time intervals between the non-removed password characters to create an invisible code.

2. The method of claim 1, further comprising:

using time units that can be used to differentiate time intervals (or special characters) inserted in chosen locations, wherein the time unit is variable for each different password or message.

3. The method of claim 2, further comprising:

using different ranges of time units to represent the different characters that have been chosen to be removed from the message or password.

4. The method of claim 3, further comprising:

selecting, by a sender, a list of characters that are to be removed from the message or password.

5. The method of claim 4, further comprising:

substituting, by the sender, a time interval range for each removed character on the list;

using the time unit to measure the correct time intervals; and informing the recipient of the message or password of the list of characters to be removed, the time interval substitutes, and the time unit being used on the date of transmission.

* * * * *